(12) United States Patent
Hosokawa (10) Patent No.: US 9,312,942 B1
(45) Date of Patent: Apr. 12, 2016

(54) DIVERSITY RECEIVER

(71) Applicant: Panasonic Corporation, Osaka (JP)

(72) Inventor: Yoshifumi Hosokawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/855,428

(22) Filed: Sep. 16, 2015

(30) Foreign Application Priority Data

Oct. 3, 2014 (JP) .................................. 2014-204931

(51) Int. Cl.
*H04B 7/08* (2006.01)
*H04B 1/16* (2006.01)

(52) U.S. Cl.
CPC ... *H04B 7/08* (2013.01); *H04B 1/16* (2013.01)

(58) Field of Classification Search
CPC .......... H04B 1/16; H04B 1/1638; H04B 7/08
See application file for complete search history.

(56) References Cited

U.S. PATENT DOCUMENTS

| | | | | |
|---|---|---|---|---|
| 2003/0109242 A1* | 6/2003 | Ohtaki | ................... | H04B 7/084 455/335 |
| 2009/0304118 A1* | 12/2009 | Yuanzhu | .............. | H04B 7/0854 375/340 |

OTHER PUBLICATIONS

A. Afsahi et al. "A Low-Power Single-Weight-Combiner 802.11abg SoC in 0.13μm CMOS for Embedded Applications Utilizing An Area and Power Efficient Cartesian Phase Shifter and Mixer Circuit" IEEE J. Solid-State Circuits, vol. 43, No. 5, pp. 1101-1118, May 2008.

* cited by examiner

*Primary Examiner* — David B. Lugo
(74) *Attorney, Agent, or Firm* — Seed IP Law Group PLLC (57) ABSTRACT

A diversity receiver includes a local oscillation (LO) signal generator that generates LO signals, each having a phase different from one other; a first frequency converter that includes a first switching mixer controlled by at least one of the LO signals and converts a frequency of a first input signal to generate a first output signal by combining the first input signal with the LO signals; a second frequency converter that includes logic circuits, each of which delivers a corresponding LO signal, and a second switching mixer controlled by an output of the logic circuits, and converts a frequency of a second input signal to generate a second output signal by combining the second input signal with the LO signals, each output of the logic circuits being activated or deactivated in accordance with a corresponding phase control signal; and a combiner that combines the first output signal from the first frequency converter and an output signal and the second signal from the second frequency converter.

8 Claims, 9 Drawing Sheets

DIVERSITY RECEIVER

BACKGROUND

1. Technical Field

The present disclosure relates to a diversity receiver.

2. Description of the Related Art

A diversity receiver using a plurality of antennas is known. According to A. Afsahi et al., "A Low-Power Single-Weight-Combiner 802.11abg SoC in 0.13 µm CMOS for Embedded Applications Utilizing An Area and Power Efficient Cartesian Phase Shifter and Mixer Circuit", IEEE J. Solid-State Circuits, vol. 43, no. 5, pp. 1101-1118, May 2008, a receiving sensitivity of such a diversity receiver is improved by adjusting a phase of a signal from each antenna, using a time-constant circuit that includes a resistor and a capacitor, and by combining adjusted signals such that a receiving level becomes largest.

SUMMARY

The related art, however, has a problem of a large circuit size of the time-constant circuit. The overall circuit size will further increases, because a time-constant circuit is desired to be provided for each operational frequency.

Thus, a non-limiting exemplary embodiment of the present disclosure provides a diversity receiver that can adjust a phase without using a time-constant circuit.

In one general aspect, the techniques disclosed here feature a diversity receiver including a local oscillation signal generator, a first frequency converter, a second frequency converter, and a combiner. The local oscillation signal generator generates a plurality of local oscillation signals, each local oscillation signal having a phase different from one another. The first frequency converter includes a first switching mixer which is controlled to be on or off by at least one of the plurality of local oscillation signals, and converts a frequency of a first input signal to generate a first output signal by combining the first input signal with the plurality of local oscillation signals. The second frequency converter includes a plurality of logic circuits, each logic circuit delivers a corresponding one of the plurality of local oscillation signals, and a second switching mixer which is controlled to be on or off by an output of the plurality of logic circuits, and converts a frequency of a second input signal to generate a second output signal by combining the second input signal with the plurality of local oscillation signals. Each output of the plurality of logic circuits is activated or deactivated in accordance with a corresponding one of phase control signals, each phase control signal indicating a phase adjustment amount to the corresponding one of the plurality of local oscillation signals. The combiner combines the first output signal and the second output signal.

These general and specific aspects may be implemented using a device, a system, a method, and a computer program, and any combination of devices, systems, methods, and computer programs.

According to the present disclosure, adjusting a phase without using a time-constant circuit can reduce a circuit size than in the related art.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Hereinafter, embodiments of the present disclosure will be described in detail with reference to the drawings.

First Embodiment

Figure 1:
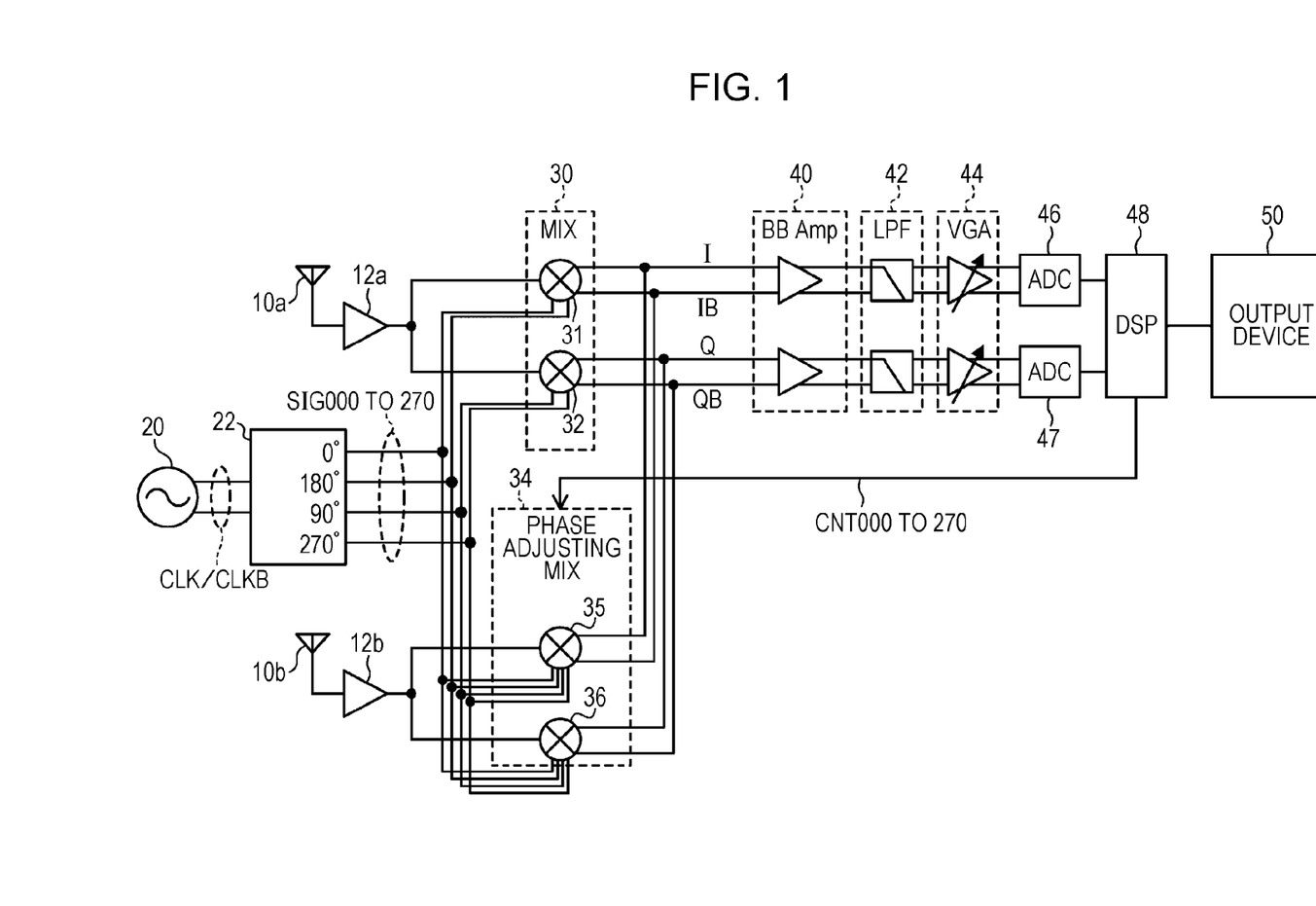
FIG. 1 is a block diagram illustrating the configuration of a diversity receiver according to a first embodiment of the present disclosure.

FIG. 1 illustrates the configuration of a diversity receiver according to a first embodiment of the present disclosure. The diversity receiver illustrated in FIG. 1 includes first and second antennas 10a, 10b, first and second low-noise transconductance amplifiers (LNTA) 12a, 12b, a synthesizer 20, a local oscillation (LO) signal generator 22, a mixer (MIX) 30, a phase adjusting mixer (phase adjusting MIX) 34, a baseband amplifier (BB Amp) 40, a low pass filter (LPF) 42, a variable gain amplifier (VGA) 44, first and second analog-to-digital converters (ADC) 46, 47, a digital signal processor (DSP) 48, and an output device 50.

The first and the second antennas 10a, 10b each receive an RF signal.

The first and the second LNTAs 12a, 12b each amplify a corresponding received RF signal, and convert the amplified signal to a current signal.

The synthesizer 20 is an oscillator that generates a positive-phase clock signal (CLK) and an opposite-phase clock signal (CLKB) that are complementary to each other.

The LO signal generator 22 divides frequencies of the complementary clock signals CLK and CLKB by two, and generates four local oscillation (LO) signals, with each LO signal having a phase shifted by 90 degrees to a phase of an adjacent LO signal. The LO signals, generated by the LO signal generator 22, include a first LO signal SIG000, a second LO signal SIG090, a third LO signal SIG180, and a fourth LO signal SIG270, which will be described later in detail.

The mixer 30 receives the four LO signals, SIG000, SIG090, SIG180, and SIG270, from the LO signal generator 22. The mixer 30 functions as a first frequency converter that combines the RF signal, received by the first antenna 10a and converted into a current signal by the first LNTA 12a, with the four LO signals to convert a frequency of the RF signal into another frequency of a baseband signal. The mixer 30 includes an I signal mixer 31 which converts the frequency of the RF signal and outputs an I signal and an IB signal that are differential signals, and a Q signal mixer 32 which converts the frequency of the RF signal and outputs a Q signal and a QB signal that are differential signals. The I signal and the Q signal are orthogonal to each other.

The phase adjusting mixer 34 receives the four LO signals, SIG000, SIG090, SIG180, and SIG270, from the LO signal generator 22, and further receives four phase control signals from the DSP 48. The phase adjusting mixer 34 functions as a second frequency converter that combines the RF signal, received by the second antenna 10b and converted into a current signal by the second LNTA 12b, with the four LO signals to convert a frequency of the RF signal into another frequency of the baseband signal. The phase adjusting mixer 34 includes an I signal mixer 35 which converts the frequency of the RF signal and outputs an I signal and n IB signal that are differential signals, and a Q signal mixer 36 which converts the frequency of the RF signal and outputs a Q signal and a QB signal that are differential signals. The phase control signals, provided from the DSP 48, include a first phase control signal CNT000, a second phase control signal CNT090, a third phase control signal CNT180, and a fourth phase control signal CNT270, which will be described later in detail.

The I signal and the IB signal, differentially output from the mixer 30, and the I signal and the IB signal, differentially output from the phase adjusting mixer 34, are connected to each other so as to be combined at an input end of the baseband amplifier 40. The Q signal and the QB signal, differentially output from the mixer 30, and the Q signal and the QB signal, differentially output from the phase adjusting mixer 34, are connected to each other so as to be combined at the input end of the baseband amplifier 40. The baseband amplifier 40 is a differential transimpedance amplifier that converts current signals, the combined I signal, the combined IB signal, the combined Q signal and the combined QB signal, into corresponding voltage signals.

The LPF 42 is a filter to attenuate interference waves which are outside of a desired band.

The VGA 44 amplifies combined I signal, combined IB signal, combined Q signal and combined QB signal that are output from the LPF 42.

The first ADC 46 converts an analog I signal and an IB signal, output from the VGA 44, into digital signals. The second ADC 47 converts an analog Q signal and an analog QB signal, output from the VGA 44, into digital signals.

The DSP 48 digitally processes the digital I signal, output from the first ADC 46, and the digital Q signal, output from the second ADC 47, in accordance with the output device 50. Further, the DSP 48 supplies the phase control signals CNT000, CNT090, CNT180, and CNT270 to the phase adjusting mixer 34.

The output device 50 may be, for example, a display, a speaker, or the like.

Figure 2:
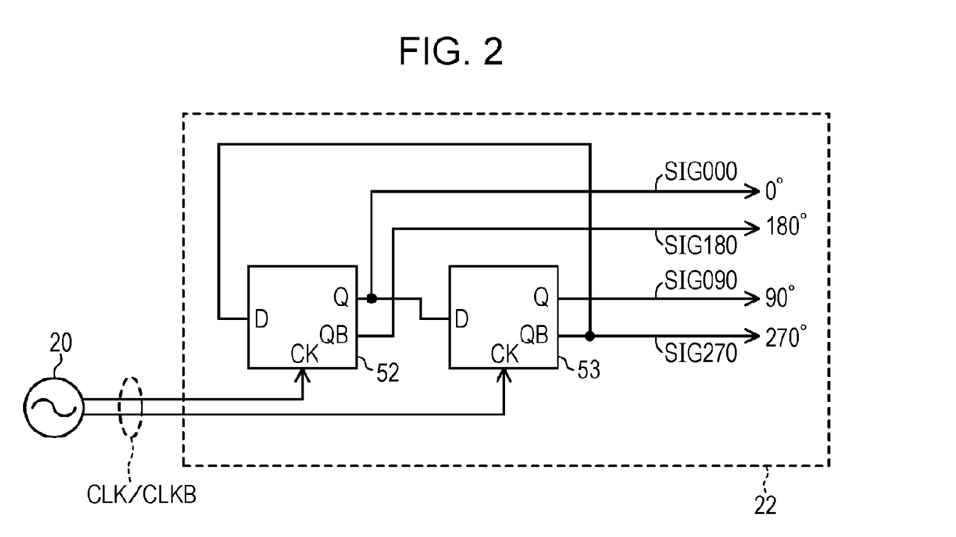
FIG. 2 is a circuit diagram illustrating a detailed configuration example of a local oscillation signal generator in FIG. 1.

FIG. 2 illustrates the detailed configuration example of the LO signal generator 22 in FIG. 1. The LO signal generator 22 illustrated in FIG. 2 includes a first D-flip-flop (D-type flip-flop circuit) 52 and a second D-flip-flop (D-type flip-flop circuit) 53 that are connected to each other in a ring-like shape. An output signal from a Q terminal of the first D-flip-flop 52 is input to a D terminal of the second D-flip-flop 53. An output signal from a QB terminal of the second D-flip-flop 53 is input to a D terminal of the first D-flip-flop 52. A CK terminal of the first D-flip-flop 52 receives the positive-phase clock signal (CLK) generated by the synthesizer 20. A CK terminal of the second D-flip-flop 53 receives the opposite-phase clock signal (CLKB) generated by the synthesizer 20. The first LO signal SIG000 is output from the Q terminal of the first D-flip-flop circuit 52. The second LO signal SIG090 is output from a Q terminal of the second D-flip-flop circuit 53. The third LO signal SIG180 is output from a QB terminal of the first D-flip-flop circuit 52. The fourth LO signal SIG270 is output from the QB terminal of the second D-flip-flop circuit 53.

Figure 3:
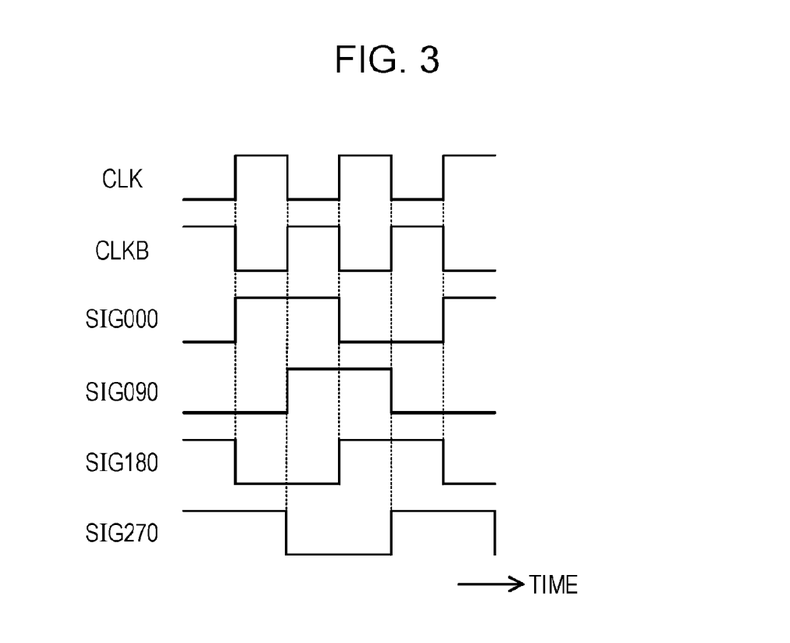
FIG. 3 is a signal waveform diagram for describing the operation of the local oscillation signal generator in FIG. 2.

FIG. 3 is a signal waveform diagram for describing the operation of the LO signal generator 22 in FIG. 2. The positive-phase clock signal CLK and the opposite-phase clock signal CLKB have a duty ratio of 50%. The first LO signal SIG000 rises at a rising edge of the positive-phase clock signal CLK, and falls at a next rising edge of the positive-phase clock signal CLK. The second LO signal SIG090 rises at a rising edge of the opposite-phase clock signal CLKB, and falls at a next rising edge of the opposite-phase clock signal CLKB. The third LO signal SIG180 is inverted to the first LO signal SIG000. The fourth LO signal SIG270 is inverted to the second LO signal SIG090. Thus, the first to fourth LO signals SIG000, SIG090, SIG180, and SIG270 have half a frequency of the complementary clock signals CLK and CLKB and a duty ratio of 50%, with each LO signal shifted in phase by 90 degrees to a phase of an adjacent LO signal.

Figure 4:
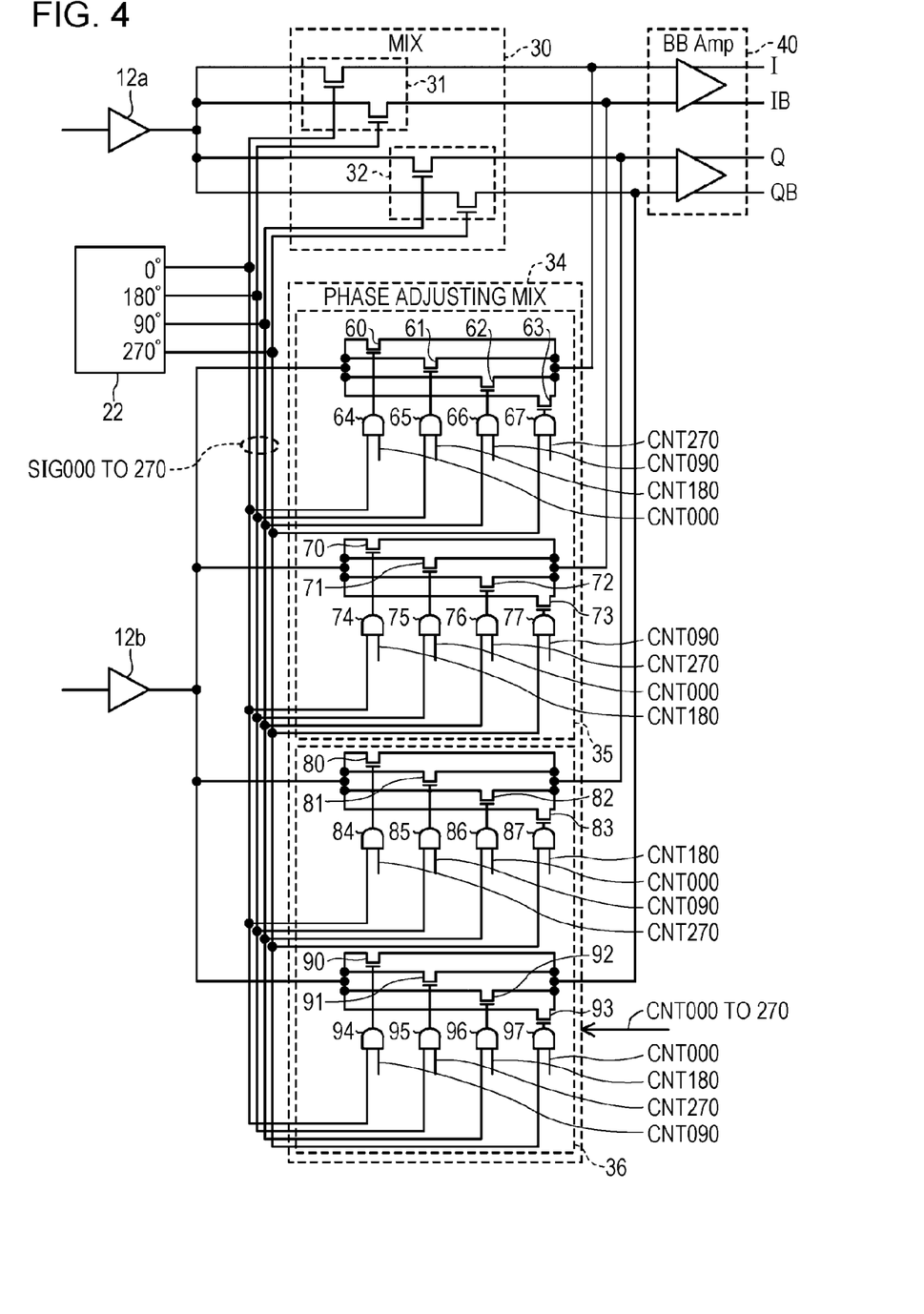
FIG. 4 is a circuit diagram illustrating a detailed configuration example of a mixer and a phase adjusting mixer in FIG. 1.

FIG. 4 illustrates the configuration example of the diversity receiver, in which the mixer 30 and the phase adjusting mixer 34 in FIG. 1 are illustrated in detail. As described above, the mixer 30 includes the I signal mixer 31 and the Q signal mixer 32, and the phase adjusting mixer 34 includes the I signal mixer 35 and the Q signal mixer 36.

The I signal mixer 31 of the mixer 30 is placed between the output side of the first LNTA 12a and the differential I-input side of the baseband amplifier 40. The I signal mixer 31 is a switching mixer including two NMOS transistors. One of the transistors receives, at its gate, the first LO signal SIG000, while the other of the transistors receives, at its gate, the third LO signal SIG180.

The Q signal mixer 32 of the mixer 30 is placed between the output side of the first LNTA 12a and the differential Q-input side of the baseband amplifier 40. The Q signal mixer 32 is a switching mixer including two NMOS transistors. One of the transistors receives, at its gate, the second LO signal SIG090, while the other of the transistors receives, at its gate, the fourth LO signal SIG270.

The I signal mixer 35 of the phase adjusting mixer 34 is placed between the output side of the second LNTA 12b and the I-input side of the baseband amplifier 40. The I signal mixer 35 includes a switching mixer that includes first to fourth NMOS transistors 60 to 63, first to fourth AND circuits 64 to 67, a switching mixer that includes fifth to eighth NMOS transistors 70 to 73, and fifth to eighth AND circuits 74 to 77. The first to fourth NMOS transistors 60 to 63 are placed between the output side of the second LNTA 12b and the non-inverting I-input side of the baseband amplifier 40. The fifth to eighth NMOS transistors 70 to 73 are placed between the output side of the second LNTA 12b and the inverting I-input side of the baseband amplifier 40. The first AND circuit 64 receives the first LO signal SIG000 and the first phase control signal CNT000 as input, and drives the gate of the first NMOS transistor 60 with the AND output. The second AND circuit 65 receives the third LO signal SIG180 and the third phase control signal CNT180 as input, and drives the gate of the second NMOS transistor 61 with the AND output. The third AND circuit 66 receives the second LO signal SIG090 and the second phase control signal CNT090 as input, and drives the gate of the third NMOS transistor 62 with the AND output. The fourth AND circuit 67 receives the fourth LO signal SIG270 and the fourth phase control signal CNT270 as input, and drives the gate of the fourth NMOS transistor 63 with the AND output. The fifth AND circuit 74 receives the first LO signal SIG000 and the third phase control signal CNT180 as input, and drives the gate of the fifth NMOS transistor 70 with the AND output. The sixth AND circuit 75 receives the third LO signal SIG180 and the first phase control signal CNT000 as input, and drives the gate of the sixth NMOS transistor 71 with the AND output. The seventh AND circuit 76 receives the second LO signal SIG090 and the fourth phase control signal CNT270 as input, and drives the gate of the seventh NMOS transistor 72 with the AND output. The eighth AND circuit 77 receives the fourth LO signal SIG270 and the second phase control signal CNT090 as input, and drives the gate of the eighth NMOS transistor 73 with the AND output.

The Q signal mixer 36 of the phase adjusting mixer 34 is placed between the output side of the second LNTA 12b and the Q-input side of the baseband amplifier 40. The Q signal mixer 36 includes a switching mixer that includes first to fourth NMOS transistors 80 to 83, first to fourth AND circuits 84 to 87, a switching mixer that includes fifth to eighth NMOS transistors 90 to 93, and fifth to eighth AND circuits 94 to 97. The first to fourth NMOS transistors 80 to 83 are placed between the output side of the second LNTA 12b and the non-inverting Q-input side of the baseband amplifier 40. The fifth to eighth NMOS transistors 90 to 93 are placed between the output side of the second LNTA 12b and the inverting Q-input side of the baseband amplifier 40. The first AND circuit 84 receives the first LO signal SIG000 and the fourth phase control signal CNT270 as input, and drives the gate of the first NMOS transistor 80 with the AND output. The second AND circuit 85 receives the third LO signal SIG180 and the second phase control signal CNT090 as input, and drives the gate of the second NMOS transistor 81 with the AND output. The third AND circuit 86 receives the second LO signal SIG090 and the first phase control signal CNT000 as input, and drives the gate of the third NMOS transistor 82 with the AND output. The fourth AND circuit 87 receives the fourth LO signal SIG270 and the third phase control signal CNT180 as input, and drives the gate of the fourth NMOS transistor 83 with the AND output. The fifth AND circuit 94 receives the first LO signal SIG000 and the second phase control signal CNT090 as input, and drives the gate of the fifth NMOS transistor 90 with the AND output. The sixth AND circuit 95 receives the third LO signal SIG180 and the fourth phase control signal CNT270 as input, and drives the gate of the sixth NMOS transistor 91 with the AND output. The seventh AND circuit 96 receives the second LO signal SIG090 and the third phase control signal CNT180 as input, and drives the gate of the seventh NMOS transistor 92 with the AND output. The eighth AND circuit 97 receives the fourth LO signal SIG270 and the first phase control signal CNT000 as input, and drives the gate of the eighth NMOS transistor 93 with the AND output.

The I signal mixer 31 of the mixer 30 has two NMOS transistors, one of which is controlled to be on or off by the first LO signal SIG000, and the other of which is controlled to be on or off by the third LO signal SIG180. The I signal mixer 31 thus converts the RF signal received from the first antenna 10a into a differential baseband I signal. Note that the operation of the I signal mixer 31 does not depend on the first to fourth phase control signals CNT000 to CNT270.

The Q signal mixer 32 of the mixer 30 also has two NMOS transistors, one of which is controlled to be on or off by the second LO signal SIG090, and the other of which is controlled to be on or off by the fourth LO signal SIG270. The Q signal mixer 32 thus outputs a differential baseband Q signal whose phase is shifted by 90 degrees to the differential baseband I signal, which is output by the I signal mixer 31. Note that the operation of the Q signal mixer 32 does not depend on the first to fourth phase control signals CNT000 to CNT270.

On the contrary, the operation of the phase adjusting mixer 34 depends on the first to fourth phase control signals CNT000 to CNT270, which are input from the DSP 48 illustrated in FIG. 1.

(1) If the first phase control signal CNT000 is "H (High)" and the other phase control signals CNT090, CNT180, and CNT270 are "L (Low)", the plurality of AND circuits in the I signal mixer 35 are activated or deactivated as follows: outputs of the first and the sixth AND circuits 64 and 75 are activated, and outputs of the other six AND circuits are deactivated by the first phase control signal CNT000. The first NMOS transistor 60 is controlled to be on or off by the first LO signal SIG000 that is delivered via the activated first AND circuit 64. The sixth NMOS transistor 71 is controlled to be on or off by the third LO signal SIG180 that is delivered via the activated sixth AND circuit 75. Thus, if only the first phase control signal CNT000 is "H", the I signal mixer 35 converts the RF signal received from the second antenna 10b into the differential baseband I signal without adjusting a phase.

In the Q signal mixer 36, outputs of the third and the eighth AND circuits 86 and 97 are activated, and outputs of the other six AND circuits are deactivated by the first phase control signal CNT000. The third NMOS transistor 82 is controlled to be on or off by the second LO signal SIG090 that is delivered via the activated third AND circuit 86. The eighth NMOS transistor 93 is controlled to be on or off by the fourth LO signal SIG270 that is delivered via the activated eighth AND circuit 97. The Q signal mixer 36 thus outputs a differential baseband Q signal whose phase is shifted by 90 degrees to a corresponding differential baseband I signal, which is output by the I signal mixer 35.

As described above, if the first phase control signal CNT000 is "H", the phase adjusting mixer 34 converts the RF signal received from the second antenna 10b into the baseband signal, by using an LO signal which is in phase with an LO signal input to the mixer 30. Then, a current output from the mixer 30 and a current output from the phase adjusting mixer 34 are combined at the input end of the baseband amplifier 40.

(2) If the second phase control signal CNT090 is "H (High)" and the other phase control signals CNT180, CNT270, and CNT000 are "L (Low)", the plurality of AND circuits in the I signal mixer 35 are activated or deactivated as follows: outputs of the third and the eighth AND circuits 66 and 77 are activated, and outputs of the other six AND circuits are deactivated by the second phase control signal CNT090. The third NMOS transistor 62 is controlled to be on or off by the second LO signal SIG090 that is delivered via the activated third AND circuit 66. The eighth NMOS transistor 73 is controlled to be on or off by the fourth LO signal SIG270 that is delivered via the activated eighth AND circuit 77. Thus, if only the second phase control signal CNT090 is "H", the I signal mixer 35 converts the RF signal received from the second antenna 10b into the differential baseband I signal with adjusting phase by 90 degrees.

In the Q signal mixer 36, outputs of the second and the fifth AND circuits 85 and 94 are activated, and outputs of the other six AND circuits are deactivated by the second phase control signal CNT090. The second NMOS transistor 81 is controlled to be on or off by the third LO signal SIG180 that is delivered via the activated second AND circuit 85. The fifth NMOS transistor 90 is controlled to be on or off by the first LO signal SIG000 that is delivered via the activated fifth AND circuit 94. The Q signal mixer 36 thus outputs a differential baseband Q signal whose phase is shifted by 90 degrees to a corresponding differential baseband I signal, which is output by the I signal mixer 35.

As described above, if the second phase control signal CNT090 is "H", the phase adjusting mixer 34 converts the RF signal received from the second antenna 10b into the baseband signal, by using an LO signal which is shifted in phase by 90 degrees to an LO signal input to the mixer 30. Then, a current output from the mixer 30 and a current output from the phase adjusting mixer 34 are combined at the input end of the baseband amplifier 40.

(3) If the third phase control signal CNT180 is "H (High)", and the other phase control signals CNT270, CNT000, and CNT090 are "L (Low)", the plurality of AND circuits in the I signal mixer 35 are activated or deactivated as follows: outputs of the second and the fifth AND circuits 65 and 74 are activated, and outputs of the other six AND circuits are deactivated by the third phase control signal CNT180. The second NMOS transistor 61 is controlled to be on or off by the third LO signal SIG180 that is delivered via the activated second AND circuit 65. The fifth NMOS transistor 70 is controlled to be on or off by the first LO signal SIG000 that is delivered via the activated fifth AND circuit 74. Thus, if only the third phase control signal CNT180 is "H", the I signal mixer 35 converts the RF signal received from the second antenna 10b into the differential baseband I signal with adjusting phase by 180 degrees.

In the Q signal mixer 36, outputs of the fourth and the seventh AND circuits 87 and 96 are activated, and outputs of the other six AND circuits are deactivated by the third phase control signal CNT180. The fourth NMOS transistor 83 is controlled to be on or off by the fourth LO signal SIG270 that is delivered via the activated fourth AND circuit 87. The seventh NMOS transistor 92 is controlled to be on or off by the second LO signal SIG090 that is delivered via the activated seventh AND circuit 96. The Q signal mixer 36 thus outputs a differential baseband Q signal whose phase is shifted by 90 degrees to a corresponding differential baseband I signal, which is output by the I signal mixer 35.

As described above, if the third phase control signal CNT180 is "H", the phase adjusting mixer 34 converts the RF signal received from the second antenna 10b into the baseband signal, by using an LO signal which is shifted in phase by 180 degrees to an LO signal input to the mixer 30. Then, a current output from the mixer 30 and a current output from the phase adjusting mixer 34 are combined at the input end of the baseband amplifier 40.

(4) If the fourth phase control signal CNT270 is "H (High)" and the other phase control signals CNT000, CNT090, and CNT180 are "L (Low)", the plurality of AND circuits in the I signal mixer 35 are activated or deactivated as follows: outputs of the fourth and the seventh AND circuits 67 and 76 are activated, and outputs of the other six AND circuits are deactivated by the fourth phase control signal CNT270. The fourth NMOS transistor 63 is controlled to be on or off by the fourth LO signal SIG270 that is delivered via the activated fourth AND circuit 67. The seventh NMOS transistor 72 is controlled to be on or off by the second LO signal SIG090 that is delivered via the activated seventh AND circuit 76. Thus, if only the fourth phase control signal CNT270 is "H", the I signal mixer 35 converts the RF signal received from the second antenna 10b into the differential baseband I signal with adjusting phase by 270 degrees.

In the Q signal mixer 36, outputs of the first and the sixth AND circuits 84 and 95 are activated, and outputs of the other six AND circuits are deactivated by the fourth phase control signal CNT270. The first NMOS transistor 80 is controlled to be on or off by the first LO signal SIG000 that is delivered via the activated first AND circuit 84. The sixth NMOS transistor 91 is controlled to be on or off by the third LO signal SIG180 that is delivered via the activated sixth AND circuit 95. The Q signal mixer 36 thus outputs a differential baseband Q signal whose phase is shifted by 90 degrees to a corresponding differential baseband I signal, which is output by the I signal mixer 35.

As described above, if the fourth phase control signal CNT270 is "H", the phase adjusting mixer 34 converts the RF signal received from the second antenna 10b into the baseband signal, by using an LO signal which is shifted in phase by 270 degrees to an LO signal input to the mixer 30. Then, a current output from the mixer 30 and a current output from the phase adjusting mixer 34 are combined at the input end of the baseband amplifier 40.

The DSP 48 illustrated in FIG. 1 causes the first to fourth phase control signals CNT000 to CNT270 to become "H" in a sequential manner, in a startup, and stores receiving levels obtained at the output of the first ADC 46 (I signal) and at the output of the second ADC 47 (Q signal), for each phase adjusted. The DSP 48 then adopts a setting of phase adjustment that enables a maximum receiving level. Alternatively, the DSP 48 may continuously monitor the receiving levels, obtained at the output of the first ADC 46 (I signal) and at the output of the second ADC 47 (Q signal), and dynamically change the setting of phase adjustment from a current setting to another setting where an adjusting phase is shifted by 90 degrees to the current setting, when the receiving levels fall below a certain reference level.

According to the first embodiment, since a phase is adjusted by selecting a phase of an LO signal used in the phase adjusting mixer 34, the time-constant circuits are not desired and a circuit size is reduced than in the related art. Further, any multiband or wideband receiver can be easily achieved.

Configuration of the LO signal generator 22 is not limited to the configuration illustrated in FIG. 2. The mixer 30 and the phase adjusting mixer 34 may include PMOS transistors.

The mixer 30 may be configured to adjust a phase, similarly to the phase adjusting mixer 34.

Second Embodiment

Figure 5:
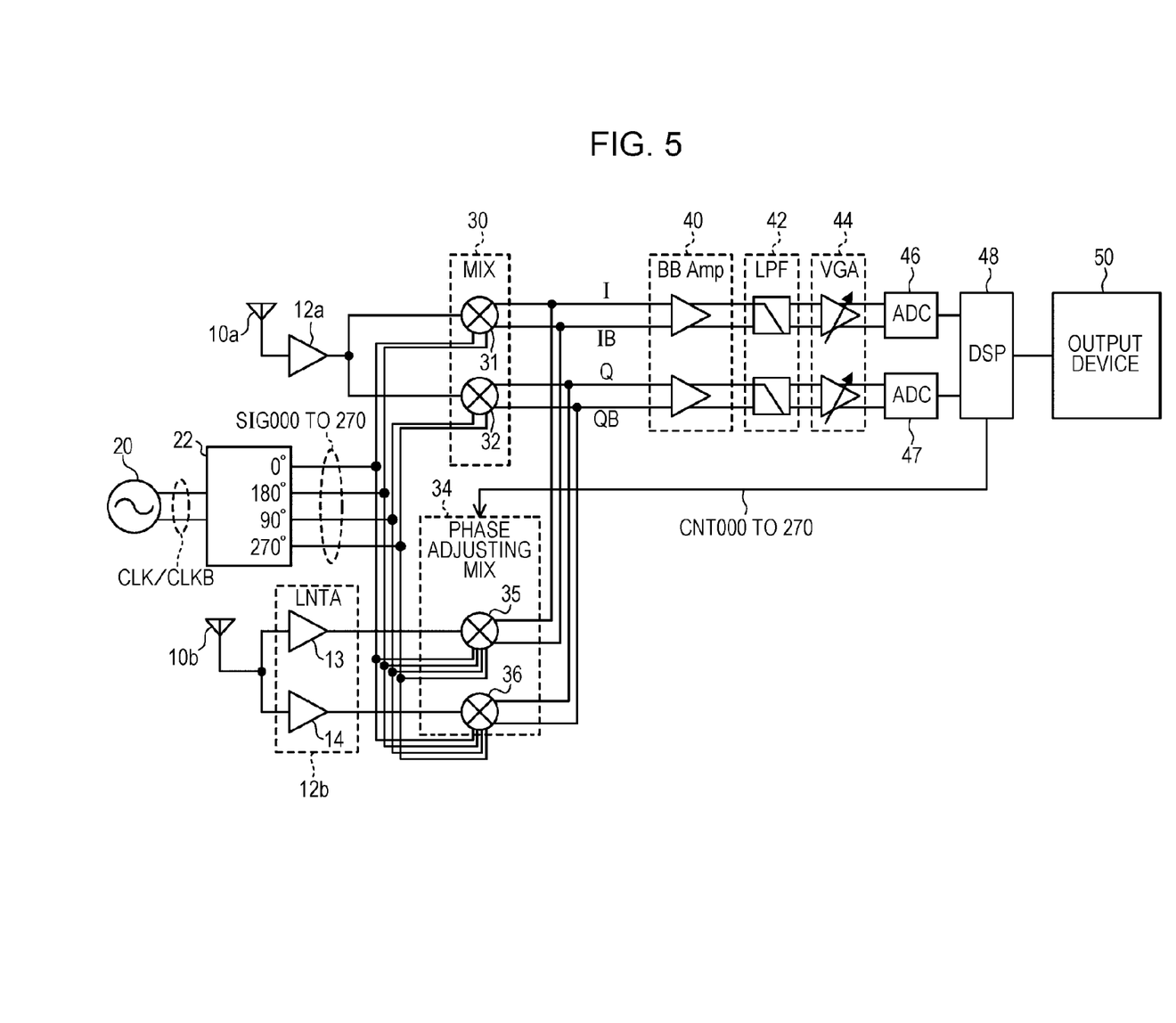
FIG. 5 is a block diagram illustrating the configuration of a diversity receiver according to a second embodiment of the present disclosure.

FIG. 5 illustrates the configuration of a diversity receiver according to a second embodiment of the present disclosure. The diversity receiver illustrated in FIG. 5 is provided with an LNTA 13 for the I signal and an LNTA 14 for the Q signal, instead of the second LNTA 12b in FIG. 1.

Figure 6:
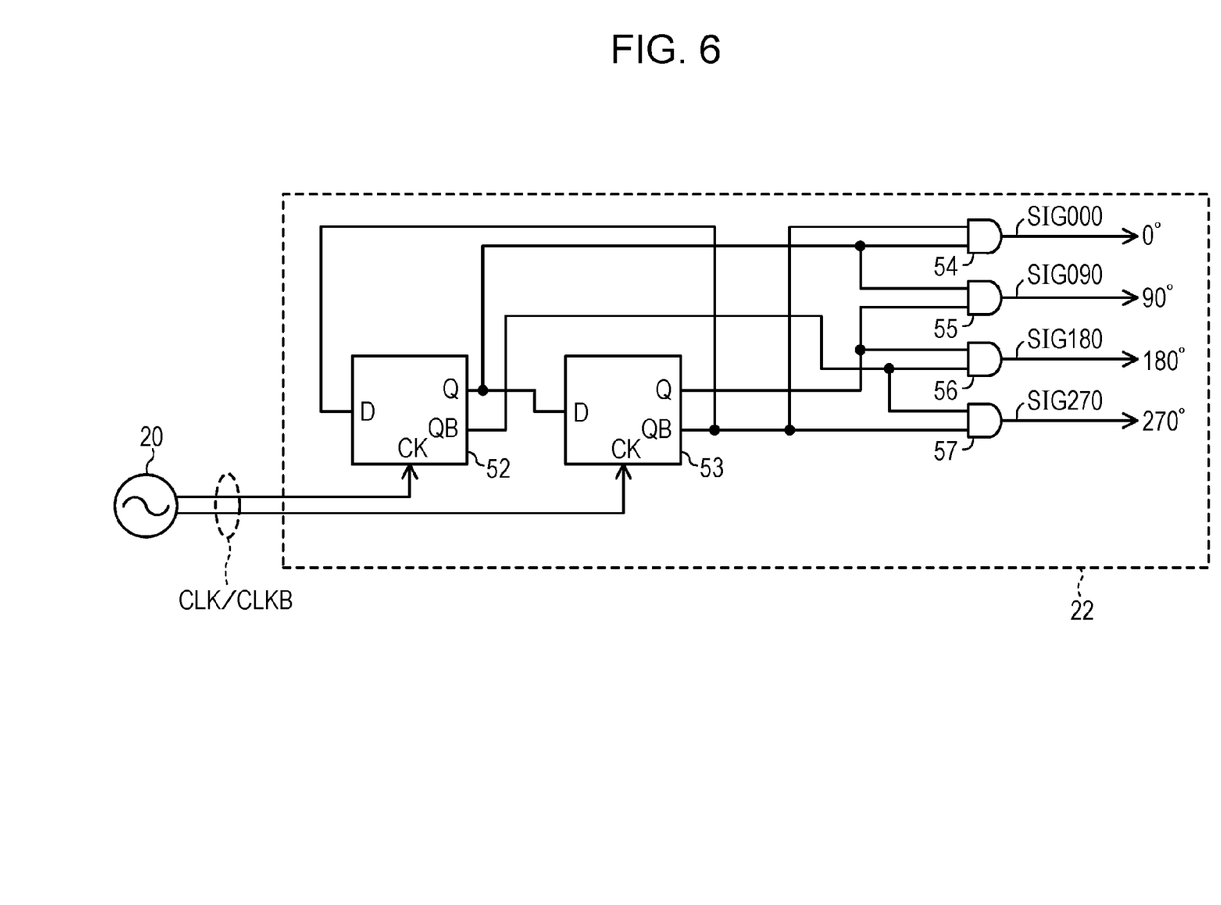
FIG. 6 is a circuit diagram illustrating a detailed configuration example of a local oscillation signal generator in FIG. 5.

FIG. 6 illustrates the detailed configuration example of the LO signal generator 22 in FIG. 5. Description for the same features as in FIG. 2 is omitted. The LO signal generator 22 illustrated in FIG. 6 includes a first D-flip-flop 52, a second D-flip-flop 53, and first to fourth AND circuits 54, 55, 56, and 57, connected in a ring-like shape. The first AND circuit 54 has two input terminals; one of which is connected to a Q terminal of the first D-flip-flop 52, and the other of which is connected to a QB terminal of the second D-flip-flop 53. The first AND circuit 54 outputs a first LO signal SIG000. The second AND circuit 55 has two input terminals; one of which is connected to the Q terminal of the first D-flip-flop 52, and the other of which is connected to a Q terminal of the second D-flip-flop 53. The second AND circuit 55 outputs a second LO signal SIG090. The third AND circuit 56 has two input terminals; one of which is connected to a QB terminal of the first D-flip-flop 52, and the other of which is connected to the Q terminal of the second D-flip-flop 53. The third AND circuit 56 outputs a third LO signal SIG180. The fourth AND circuit 57 has two input terminals; one of which is connected to the QB terminal of the first D-flip-flop 52, and the other of which is connected to the QB terminal of the second D-flip-flop 53. The fourth AND circuit 57 outputs a fourth LO signal SIG270.

Figure 7:
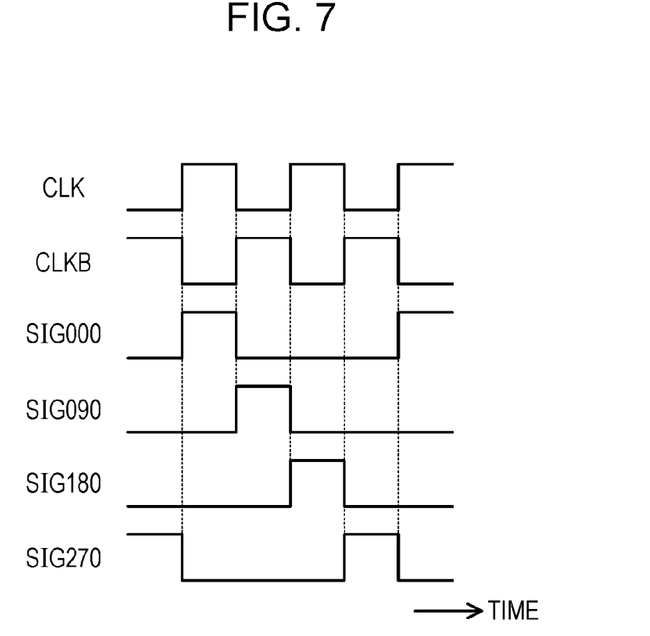
FIG. 7 is a signal waveform diagram for describing the operation of the local oscillation signal generator in FIG. 6.

FIG. 7 is a signal waveform diagram for describing the operation of the LO signal generator 22 illustrated in FIG. 6. The positive-phase clock signal CLK and the opposite-phase clock signal CLKB have a duty ratio of 50%. The first to fourth LO signals SIG000, SIG090, SIG180, and SIG270 have half a frequency of the complementary clock signals CLK/CLKB and a duty ratio of 25%, with each LO signal shifted in phase by 90 degrees to a phase of an adjacent LO signal.

Figure 8:
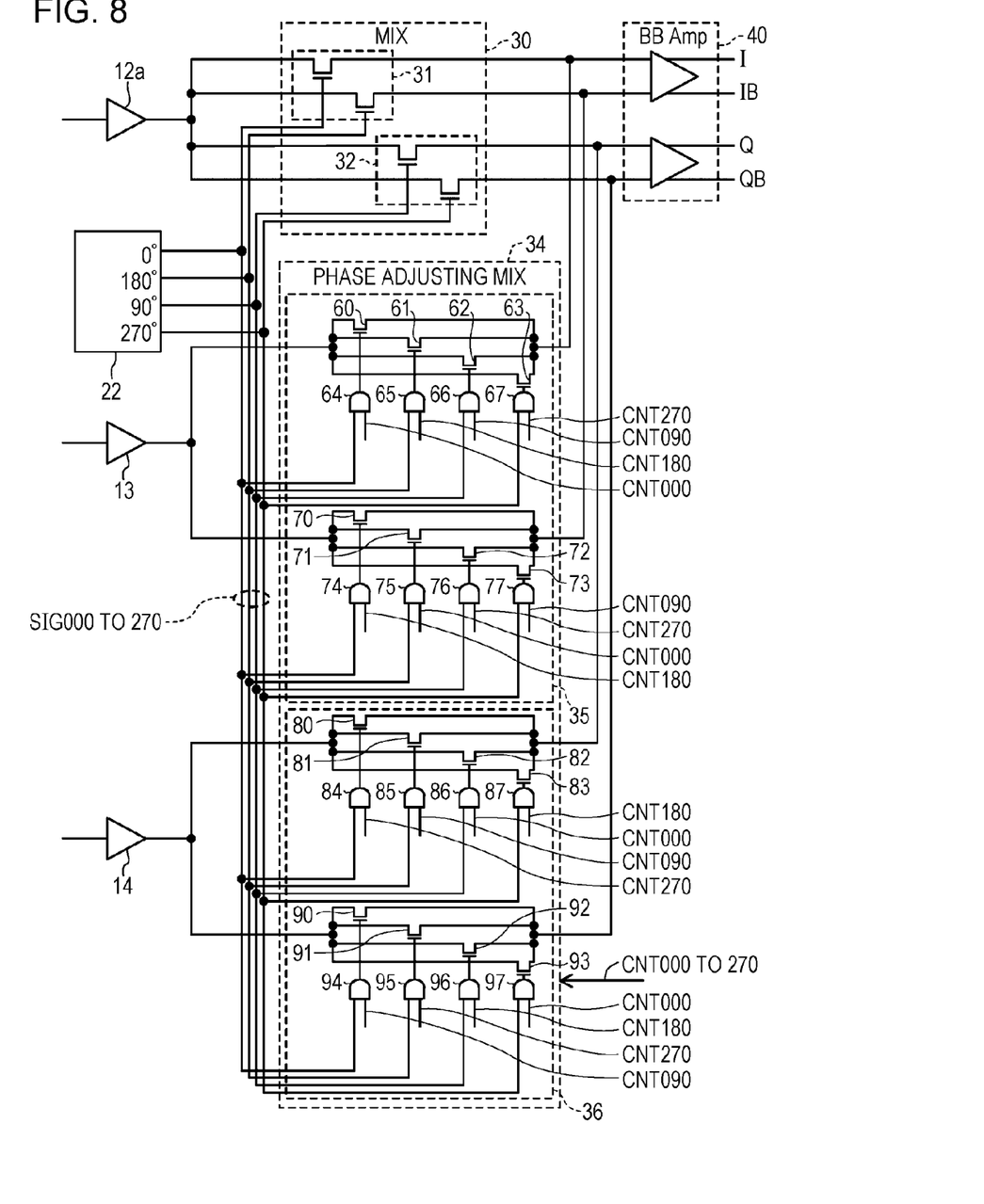
FIG. 8 is a circuit diagram illustrating a detailed configuration example of a mixer and a phase adjusting mixer in FIG. 5.

FIG. 8 illustrates the configuration example of the diversity receiver, in which a mixer 30 and a phase adjusting mixer 34 in FIG. 5 are illustrated in detail. Detailed description for the same features as in FIG. 4 is omitted. An I signal mixer 35 of the phase adjusting mixer 34 is placed between the output side of the LNTA 13 used for the I signal and connected to a second antenna 10b, and a differential I-input side of a baseband amplifier 40. A Q signal mixer 36 of the phase adjusting mixer 34 is placed between the output side of the LNTA 14 used for the Q signal and connected to the second antenna 10b, and a differential Q-input side of the baseband amplifier 40.

According to the mixer 30 and the phase adjusting mixer 34 illustrated in FIG. 8, if the first phase control signal CNT000 is "H (High)" and the other phase control signals CNT090, CNT180, and CNT270 are "L (Low)", the phase adjusting mixer 34 converts the RF signal received from the second antenna 10b into a baseband signal, by using an LO signal which is in phase with an LO signal input to the mixer 30, as in FIG. 4. If the second phase control signal CNT090 is "H" and the other phase control signals CNT180, CNT270, and CNT000 are "L", the phase adjusting mixer 34 converts the RF signal received from the second antenna 10b into the baseband signal, by using an LO signal whose phase is shifted by 90 degrees to an LO signal input to the mixer 30, as in FIG. 4. If the third phase control signal CNT180 is "H" and the other phase control signals CNT270, CNT000, and CNT090 are "L", the phase adjusting mixer 34 converts the RF signal received from the second antenna 10b into the baseband signal, by using an LO signal whose phase is shifted by 180 degrees to an LO signal input to the mixer 30, as in FIG. 4. If the fourth phase control signal CNT270 is "H" and the other phase control signals CNT000, CNT090, and CNT180 are "L", the phase adjusting mixer 34 converts the RF signal received from the second antenna 10b into the baseband signal, by using an LO signal whose phase is shifted by 270 degrees to an LO signal input to the mixer 30, as in FIG. 4.

Figure 9:
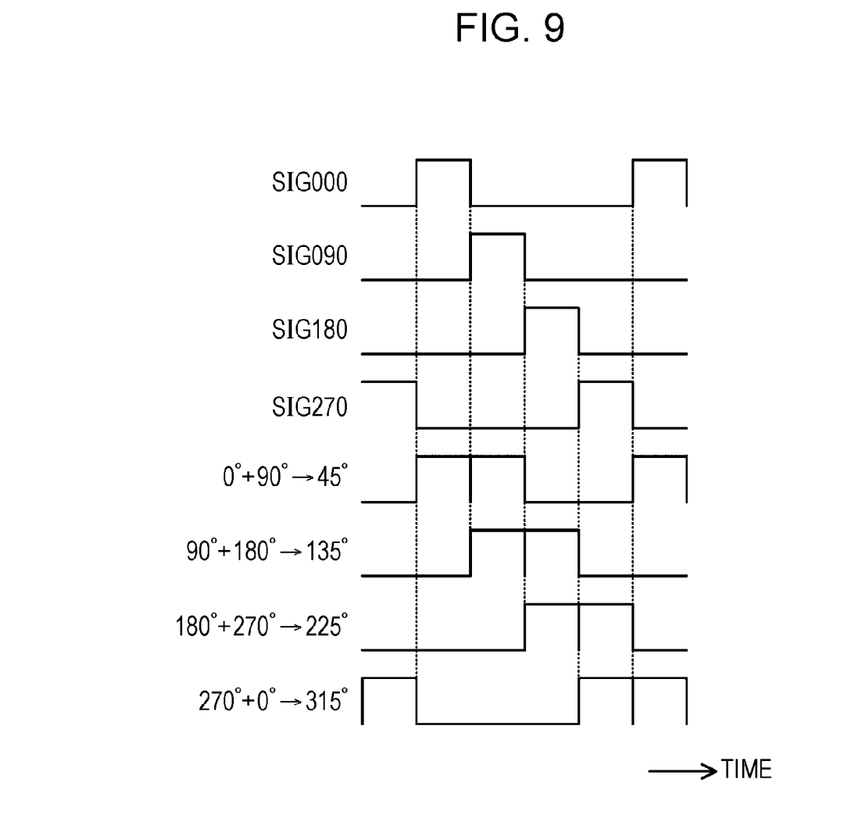
FIG. 9 is a signal waveform diagram for describing an operation example of the phase adjusting mixer in FIG. 8.

As described above, the DSP 48 illustrated in FIG. 5 sets any one of the first to fourth phase control signals CNT000, CNT090, CNT180, and CNT270 to "H", thereby adjusting a phase in steps of 90 degrees. As illustrated in FIG. 9, The DSP 48 may set both the first and the second phase control signals CNT000 and CNT090 to "H", or may set both the second and the third phase control signals CNT090 and CNT180 to "H", or may set both the third and the fourth phase control signals CNT180 and CNT270 to "H", or may set both the fourth and the first phase control signals CNT270 and CNT000 to "H". The above setting can adjust a phase in steps of 45 degrees. That is, combining two LO signals whose phases are shifted by 90 degrees to each other causes corresponding phase control signals to be adjusted to an intermediate phase between the two LO signals.

According to the second embodiment, since a phase is adjusted by selecting a phase of an LO signal used in the phase adjusting mixer 34, the time-constant circuits are not desired and a circuit size is reduced than in the related art. Further, any multiband or wideband receiver can be easily achieved. In addition, the phase adjustment can be performed more finely than in the first embodiment.

Configuration of the LO signal generator 22 is not limited to the configuration illustrated in FIG. 6. The mixer 30 and the phase adjusting mixer 34 may include PMOS transistors.

The LO signal generator 22 may divide an output frequency of the synthesizer 20 by 2n (where n is a natural number of one or more) and generate 4n LO signals having a duty ratio of 1/(4n)×100%, with each LO signal shifted in phase by 360/(4n) degrees to a phase of an adjacent LO signal. The mixer 30 and the phase adjusting mixer 34 may use the 4n LO signals to convert a frequency. When n is a natural number of two or more, the phase adjusting mixer 34 may include three or more switching mixers that operate together.

Third Embodiment

Figure 10:
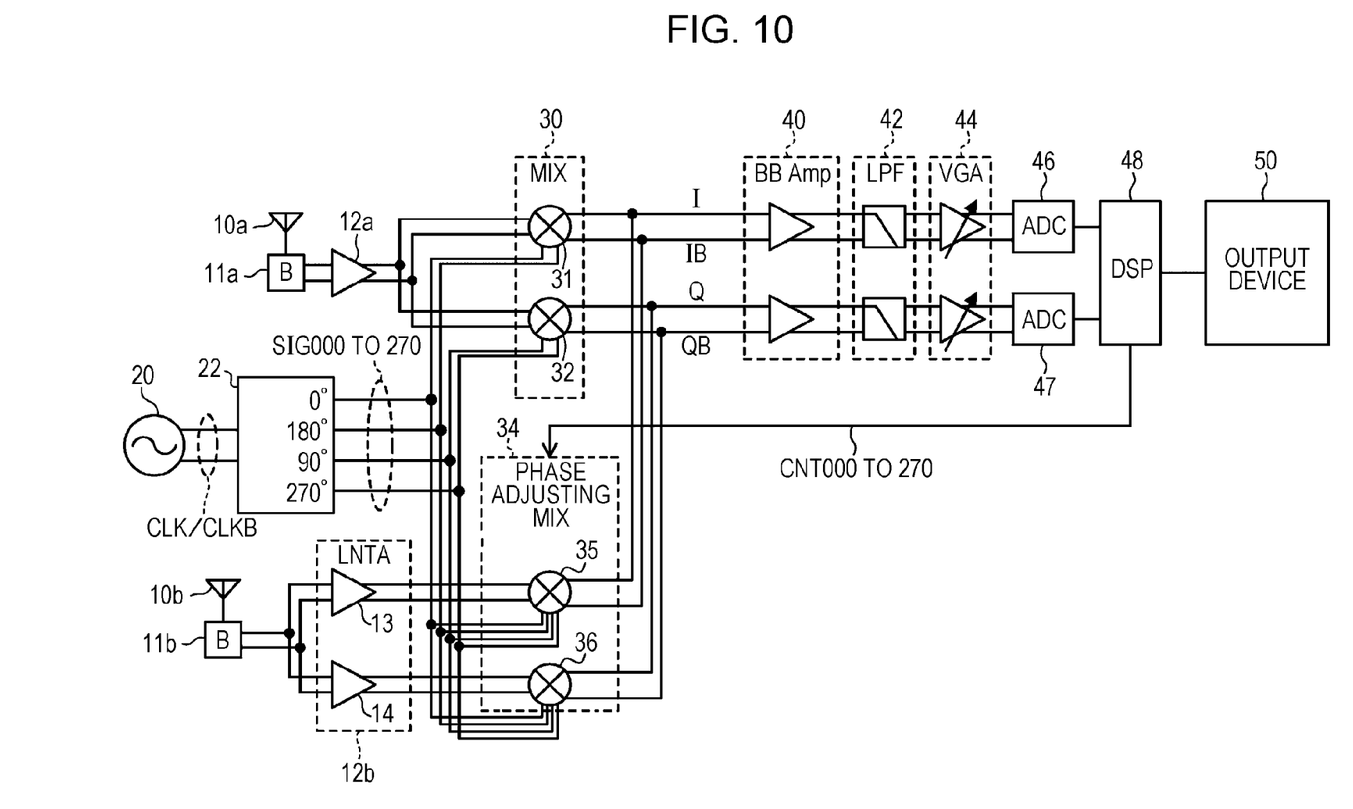
FIG. 10 is a block diagram illustrating the configuration of a diversity receiver according to a third embodiment of the present disclosure.

FIG. 10 illustrates the configuration of a diversity receiver according to a third embodiment of the present disclosure. Description for the same features as in FIG. 2 is omitted. The diversity receiver illustrated in FIG. 10 includes a balun (B) 11a provided between a first antenna 10a and a first LNTA 12a, for single-to-differential conversion. The diversity receiver in FIG. 10 also includes another balun (B) 11b provided between a second antenna 10b and a second LNTA 12b, for single-to-differential conversion. The second LNTA 12b includes an LNTA 13 for the I signal and an LNTA 14 for the Q signal. The first LNTA 12a, the second LNTA 12b, the mixer 30, and the phase adjusting mixer 34 each have a differential input and a differential output. That is, the mixer 30 and the phase adjusting mixer 34 in the third embodiment are double balanced mixers.

The diversity receiver in FIG. 10 differs from those in the first embodiment (FIG. 1) and the second embodiment (FIG. 5) in that the diversity receiver in FIG. 10 has a fully differential configuration, but operates in the same manner as in the first and the second embodiments. Description for the detailed internal configurations of the mixer 30 and the phase adjusting mixer 34 is omitted.

As described above, the diversity receiver according to the present disclosure can have a reduced circuit size than in the related art, and can be used advantageously.

What is claimed is:
1. A diversity receiver comprising:
 a local oscillation signal generator that generates a plurality of local oscillation signals, each local oscillation signal having a phase different from one another;
 a first frequency converter that includes a first switching mixer which is controlled to be on or off by at least one of the plurality of local oscillation signals, and that converts a frequency of a first input signal to generate a first output signal by combining the first input signal with the at least one of the plurality of local oscillation signals;

a second frequency converter that includes a plurality of logic circuits, each logic circuit delivers a corresponding one of the plurality of local oscillation signals, and a second switching mixer which is controlled to be on or off by an output of the plurality of logic circuits, and that converts a frequency of a second input signal to generate a second output signal by combining the second input signal with at least one of the plurality of local oscillation signals, each output of the plurality of logic circuits being activated or deactivated in accordance with a corresponding one of phase control signals, each phase control signal indicating a phase adjustment amount to the corresponding one of the plurality of local oscillation signals; and a combiner that combines the first output signal and the second output signal.

2. The diversity receiver according to claim 1, wherein the plurality of local oscillation signals are four local oscillation signals, each of which has a duty ratio of 50% and is shifted in phase by 90 degrees to a phase of an adjacent local oscillation signal.

3. The diversity receiver according to claim 1, wherein the plurality of local oscillation signals are four local oscillation signals, each of which has a duty ratio of 25% and is shifted in phase by 90 degrees to a phase of an adjacent local oscillation signal.

4. The diversity receiver according to claim 1,
wherein the first switching mixer includes a first I signal mixer that converts a frequency of the first input signal and outputs a first I signal and a first IB signal that are differential signals, and a first Q signal mixer that converts the frequency of the first input signal and outputs a first Q signal and a first QB signal that are other differential signals, and wherein the second switching mixer includes a second I signal mixer that converts a frequency of the second input signal and outputs a second I signal and a second IB signal that are differential signals, and a second Q signal mixer that converts the frequency of the second input signal and outputs a second Q signal and a second QB signal.

5. The diversity receiver according to claim 1, wherein each of the first frequency converter and the second frequency converter has a differential input configuration.

6. The diversity receiver according to claim 1, wherein the plurality of local oscillation signals are 4n local oscillation signals, each of which has a duty ratio of $1/(4n) \times 100\%$, where n is a natural number that is equal to or greater than one, and each of the 4n local oscillation signals is shifted in phase by $360/(4n)$ degrees to a phase of an adjacent local oscillation signal.

7. The diversity receiver according to claim 6, wherein two or more outputs of the plurality of logic circuits are activated simultaneously.

8. The diversity receiver according to claim 6, wherein outputs of two logic circuits of the plurality of logic circuits are activated simultaneously, the two logic circuits delivering two local oscillation signals of the plurality of local oscillation signals, the two local oscillation signals being shifted in phase by $360/(4n)$ degrees to each other.

* * * * *